(12) United States Patent
Jeng et al.

(10) Patent No.: US 9,969,121 B2
(45) Date of Patent: May 15, 2018

(54) MULTIFUNCTIONAL 3D SCANNING AND PRINTING APPARATUS

(71) Applicant: National Taiwan University of Science and Technology, Taipei (TW)

(72) Inventors: Jeng-Ywan Jeng, Taipei (TW); Tzung-Han Lin, Taipei (TW); Yi-Jane Chen, Taipei (TW)

(73) Assignee: NATIONAL TAIWAN UNIVERSITY OF SCIENCE AND TECHNOLGY, Taipei (TW)

( * ) Notice: Subject to any disclaimer, the term of this patent is extended or adjusted under 35 U.S.C. 154(b) by 375 days.

(21) Appl. No.: 14/584,489

(22) Filed: Dec. 29, 2014

(65) Prior Publication Data

US 2016/0052210 A1 Feb. 25, 2016

(30) Foreign Application Priority Data

Aug. 19, 2014 (TW) .............................. 103214819 A

(51) Int. Cl.
| | |
|---|---|
| G06F 19/00 | (2018.01) |
| B29C 64/00 | (2017.01) |
| G05B 15/02 | (2006.01) |
| H04N 1/047 | (2006.01) |
| H04N 1/028 | (2006.01) |
| B29C 67/00 | (2017.01) |
| B33Y 50/00 | (2015.01) |
| B33Y 50/02 | (2015.01) |
| B29C 64/386 | (2017.01) |

(52) U.S. Cl.
CPC .......... *B29C 64/00* (2017.08); *B29C 67/0051* (2013.01); *B33Y 50/00* (2014.12); *G05B 15/02* (2013.01); *H04N 1/02815* (2013.01); *H04N 1/02895* (2013.01); *H04N 1/047* (2013.01); *B29C 64/386* (2017.08); *B33Y 50/02* (2014.12)

(58) Field of Classification Search
CPC .. H04N 1/0461; H04N 1/047; B29C 67/0088; G01S 17/46
USPC ......................................................... 700/98
See application file for complete search history.

(56) References Cited

U.S. PATENT DOCUMENTS

| | | | | |
|---|---|---|---|---|
| 5,805,296 | A * | 9/1998 | Hattori ................. | H04N 1/0461 347/241 |
| 6,533,420 | B1 * | 3/2003 | Eichenlaub ........ | G02B 27/2214 348/E13.029 |
| 8,106,937 | B2 * | 1/2012 | Schechterman ... | A61B 1/00193 348/42 |
| 2001/0023921 | A1 * | 9/2001 | Mano ................... | G02B 26/123 250/234 |

(Continued)

*Primary Examiner* — Michael D Masinick
(74) *Attorney, Agent, or Firm* — Haynes & Boone, LLP

(57) ABSTRACT

A multifunctional 3D scanning/printing apparatus is disclosed in the present invention, wherein the multifunctional apparatus comprises both 3D scanning and printing functions, by sharing a Digital Light Processing (DLP) projector or using a beam splitter (for example, a transflective mirror or a flipping mirror, etc.) to achieve a configuration for all sorts of 3D scanning and 3D printing equipment with the required elements within the same apparatus, and uses the accuracy-increasing apparatus (for example, a prism, a lenticular lens, other asymmetric lenses, etc.) so that the measurement accuracy from the two image sensors will not be restricted by the limited space.

19 Claims, 6 Drawing Sheets

(56) References Cited

U.S. PATENT DOCUMENTS

| | | | | |
|---|---|---|---|---|
| 2010/0125356 A1* | 5/2010 | Shkolnik | ............... | G06T 1/00 |
| | | | | 700/98 |
| 2015/0109424 A1* | 4/2015 | Lee | ............... | A61C 9/006 |
| | | | | 348/50 |
| 2015/0286340 A1* | 10/2015 | Send | ............... | G01S 17/46 |
| | | | | 345/175 |
| 2015/0298395 A1* | 10/2015 | Yeh | ............... | B29C 67/0088 |
| | | | | 700/120 |

* cited by examiner

MULTIFUNCTIONAL 3D SCANNING AND PRINTING APPARATUS

CROSS-REFERENCE TO RELATED APPLICATION AND CLAIM OF PRIORITY

The application claims the benefit of the Taiwan Patent Application No. 103214819, filed on Aug. 19, 2014, at the Taiwan Intellectual Property Office, the disclosure of which is incorporated herein in its entirety by reference.

FIELD OF THE INVENTION

The present invention relates to a multifunctional apparatus, specially a multifunctional apparatus which has a 3D scanning function and a 3D printing function.

BACKGROUND OF THE INVENTION

Additive Manufacturing, 3D Printing or Rapid Prototyping is a technology for rapidly manufacturing 3D objects. 3D spatial data of an object is first captured using an image sensor, and then materials are stacked into a 3D object from points or planes via computer processing. In the prior art, when manufacturing a 3D object using the rapid prototyping method, 3D scanning and 3D printing are typically carried out separately by two mutually-independent apparatuses, thus a larger space is needed to accommodate both of the apparatuses, and this is inconvenient. However, to integrate 3D scanning and 3D printing into the same apparatus, the following problems need to be overcome: (1) because the necessary elements for 3D scanning and those for 3D printing apparatuses are quite different, a method is needed to configure those elements within a limited space (same apparatus). (2) the major goal for the 3D scanning apparatus with two image sensors in the prior art is to expand the scanning range; however, measurement errors for the scans increase as the angle between the two image sensors decreases; if the angle between two image sensors is increased so as to decrease the measurement errors, the distance between the two image sensors must be lengthened, which requires a larger space to house the image sensor. Therefore, the second problem is how to prevent the accuracy of the measurements from two image sensors from being restricted by the limited space. How to solve the problems above is a significant issue for one skilled in the art looking to find solutions and improvements.

In order to overcome the drawbacks in the prior art, a multifunctional 3D scanning and printing apparatus is disclosed. The particular design in the present invention not only solves the problems described above, but also is easy to implement. Thus, the present invention has utility for the industry.

SUMMARY OF THE INVENTION

In order to solve the above problems, a multifunctional 3D scanning/printing apparatus is disclosed in the present invention, wherein the multifunctional apparatus includes 3D scanning and printing functions, by sharing a Digital Light Processing (DLP) projector and using a beam splitter (for example, a transflective mirror or a flipping mirror, etc.) to achieve a configuration for all sorts of 3D scanning and 3D printing equipment with the required elements all in one apparatus, and uses the accuracy-increasing apparatus (for example, a prism, a lenticular lens and other asymmetric lenses, etc) so that the accuracy of the measurements from two image sensors will not be restricted by the limited space.

In accordance with one aspect of the present invention, a multifunctional 3D scanning/printing apparatus for scanning/printing an object is disclosed. The multifunctional 3D scanning/printing apparatus includes an apparatus body kept at a specific position relative to the object; a scanning module configured on the apparatus body to capture 3D image data corresponding to the object; an accuracy-increasing apparatus configured between the scanning module and the object to increase the accuracy of the 3D image data; a computer apparatus coupled to the scanning module which transforms the 3D image data into a 3D movement control output signal; a printing module coupled to the computer apparatus which outputs a 3D structure based on the 3D movement control output signal; and a beam splitter distributing a light onto the object and the printing module.

In accordance with the aforementioned aspect of the present invention, a multifunctional 3D scanning/printing apparatus for scanning/printing an object is disclosed. The multifunctional 3D scanning/printing apparatus includes an apparatus body maintained at a specific position relative to the object; a scanning module configured on the apparatus body to capture 3D image data corresponding to the object; a printing module configured on the apparatus body to output a 3D structure corresponding to the object according to the 3D image data; and a projector maintained at a specific position relative to the scanning module, the printing module and the object, which projects a light onto the object and serves as a heat source for the printing module.

In accordance with the aforementioned aspect of the present invention, a multifunctional 3D scanning/printing apparatus for scanning/printing an object is disclosed. The multifunctional 3D scanning/printing apparatus includes an apparatus body maintained at a specific position relative to the object; an input unit configured on the apparatus body to capture 3D image data corresponding to the object; and an output unit configured on the apparatus body to output a 3D structure corresponding to the object according to the 3D image data.

DETAILED DESCRIPTION OF THE PREFERRED EMBODIMENT

The present invention "Multifunctional 3D Scanning and Printing Apparatus" is described in the following content, and those skilled in the current art should understand that the present invention is not restricted by the following descriptions, which are simply the explanations of the embodiments.

Figure 1:
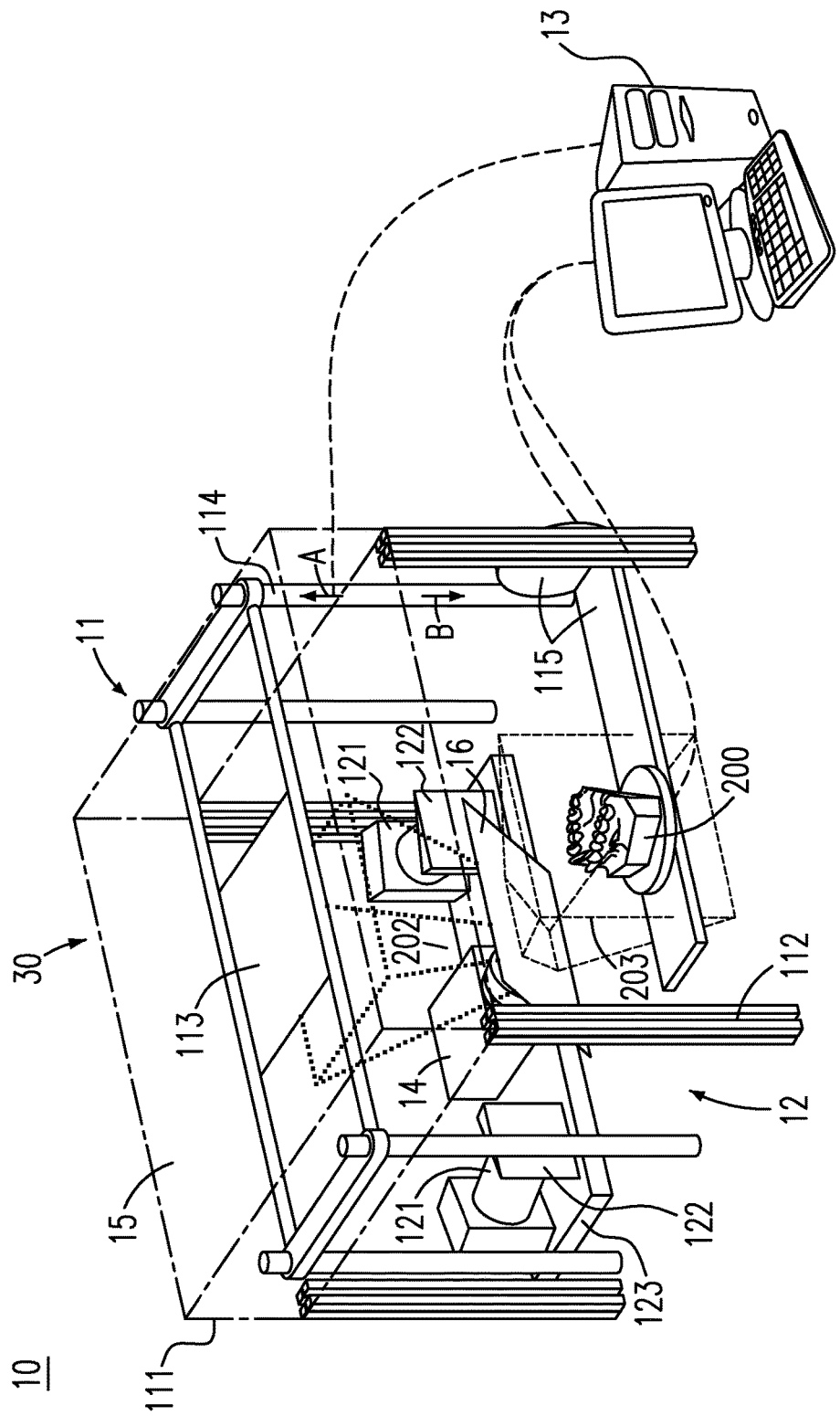
FIG. 1 is a schematic diagram of one embodiment of the multifunctional 3D scanning/printing apparatus in the present invention.

The following descriptions disclose a multifunctional 3D scanning/printing apparatus 10 in FIG. 1 according to an embodiment of the present application. However, the actual structure is not fully necessary to meet the described structure. One skilled in the art can make many sorts of changes and modifications while being within the substantial spirit and scope of the present disclosure. In order to briefly describe the technical content of the present invention, the same element in each embodiment is indicated with the same element name and number. As to the drawings, the main purpose of the drawings is to provide a visual reference for the explanations with the assistance of the specification, and the drawings do not necessarily meet the actual scale and accurate configuration for the implementation of the present invention. Therefore, the scope of the actual implementation of the present invention should not be interpreted and restricted by the scale and configuration relationship shown in the attached drawings.

Figure 2:
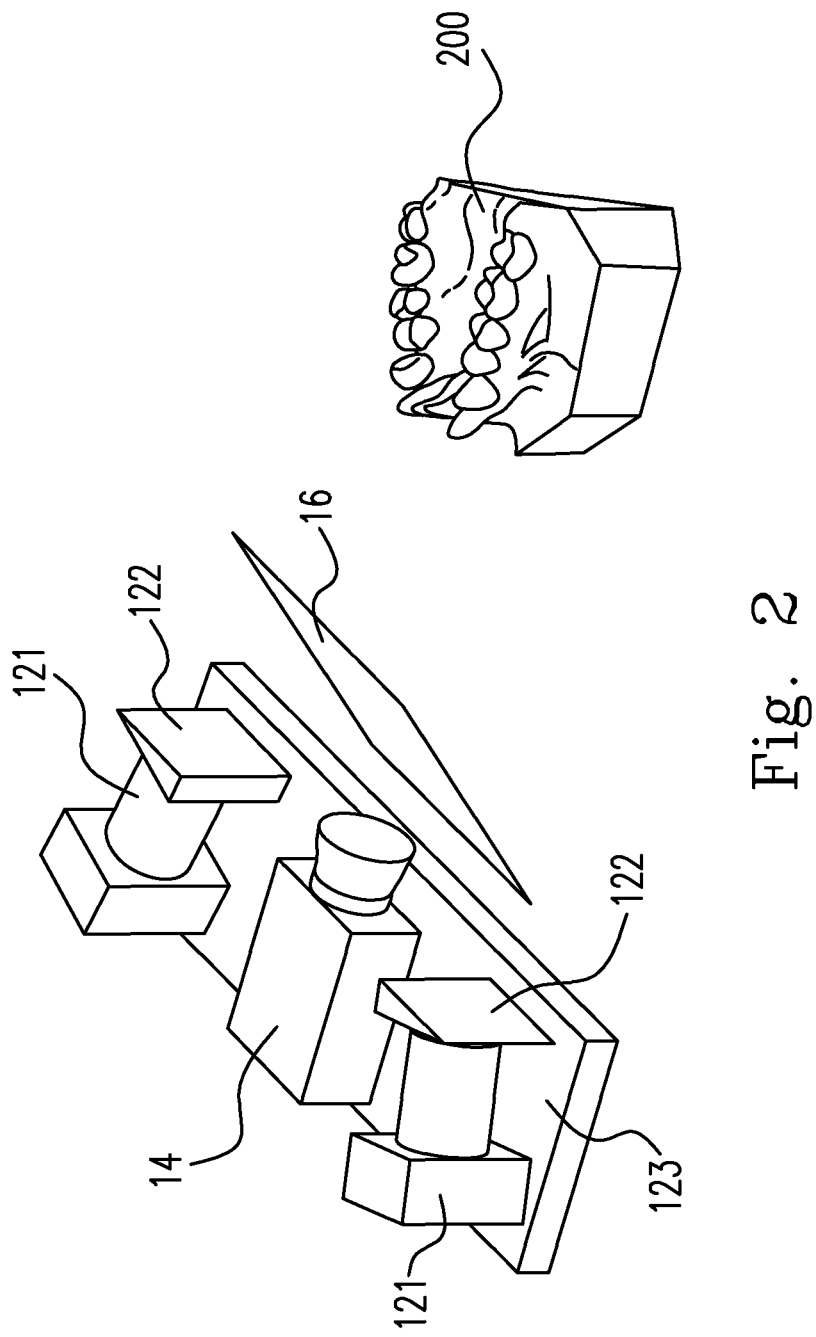
FIG. 2 is a schematic diagram of the relative positions for the image sensor, projector, beam splitter and the object to be scanned in FIG. 1.

Please refer to FIG. 1, which is the schematic diagram of the multifunctional 3D scanning/printing apparatus 10 according to the first embodiment of the present invention, and FIG. 2 is the schematic diagram showing the relative positions of the image sensor 121, projector (or light projection apparatus) 14, beam splitter 16 and the object 200 in FIG. 1. Referring to FIG. 1 and FIG. 2 simultaneously, the capturing region and the printing region of the multifunctional 3D scanning/printing apparatus 10 according to the embodiment are two independently different regions. The multifunctional 3D scanning/printing apparatus 10 includes an apparatus body 30, a scanning module 12, an accuracy-increasing apparatus 122, a computer apparatus 13, a printing module 11 and a beam splitter 16, wherein the multifunctional 3D scanning/printing apparatus 10 further includes a projector 14.

The scanning module 12 and the printing module 11 are both configured on the apparatus body 30, and the relationship between the two modules is that the printing module 11 is configured on the scanning module 12, wherein the scanning module 12 and the printing module 11 share the projector 14 and the projector 14 is preferably a DLP projector in the first embodiment of the present invention. The scanning module 12 further includes a tiltable and horizontally rotatable mechanism 115 and two image sensors 121. The image sensor 121 is preferably a high resolution camera in the first embodiment of the present invention, wherein the projector 14 and the two image sensors 121 are fixed, with a distance, on a holder 123, and the holder 123 is preferably (but not restricted to) a metal holder. A raster is projected from the projector 14 and combined with the technology for capturing images by scans from the two image sensors 121, and the tiltable and horizontally rotatable mechanism 115 rotates the object 200 to get the complete 3D shape contour data of the object 200.

A multifunctional 3D non-contact measurement method, which combines structured light technology, phase measurement technology and computer vision technology, is utilized in the present invention. The image sensor 121 can simultaneously capture the image data of the entire surface of the object 200, and the projector 14 projects specifically encoded patterns of structured light onto the object to be measured during the measurement process, wherein the encoding methods can be divided into three methods as follows. (1) Projecting black and white stripes as an encoding method, which performs the encoding through black and white stripes of different densities. It is necessary to take several pictures to completely capture the entire surface, wherein each picture has different stripe density, and then the 3D depth is calculated according to the offsets of the stripes. (2) Projecting colorful stripes as an encoding method, which performs the encoding using color, and so the color code of each color area is known in advance. (3) Projecting random points as an encoding method, wherein the random points are the data on a stationary picture, so the point arrangement of each area is known in advance. We calculate the differences along the x-axis coordinate direction by comparing the areas, and then calculate the depth. Therefore, we utilize at least two sets of image sensors 121 in the present embodiment, and use the image processing method to find the phase differences using corresponding areas. Then, we decode the image and calculate the phase, and calculate the 3D coordinates of the pixel points in the common visible region of the two image sensors 121 using matching technology and triangulation measurement principles. In addition, we use at least two sets of image sensors 121 to capture the image synchronously to reduce any measurement gaps.

In addition, in the first embodiment of the present invention, in order to reduce the required space within the apparatus body 30, the distance between two image sensors 121 is decreased as much as possible, which causes the angle between two image sensors 121 decrease correspondingly. In order to prevent measurement errors from increasing as the angle between two image sensors 121 decreases, an accuracy-increasing apparatus is configured between the scanning module 12 and the object 200 in the present embodiment to increase the accuracy of the 3D image. In the first embodiment of the present invention, the accuracy-increasing apparatus is (but not restricted to) an asymmetric lens, for example, a prism, a lenticular lens, etc.

In the present embodiment, the scanning module 12 has the advantage of light measurement technology. The complicated surface of the entire or part of the scanned object 200 can be accurately measured, and we can online rapidly and accurately measure the object to get the 3D data for the scanned object 200.

Figure 3:
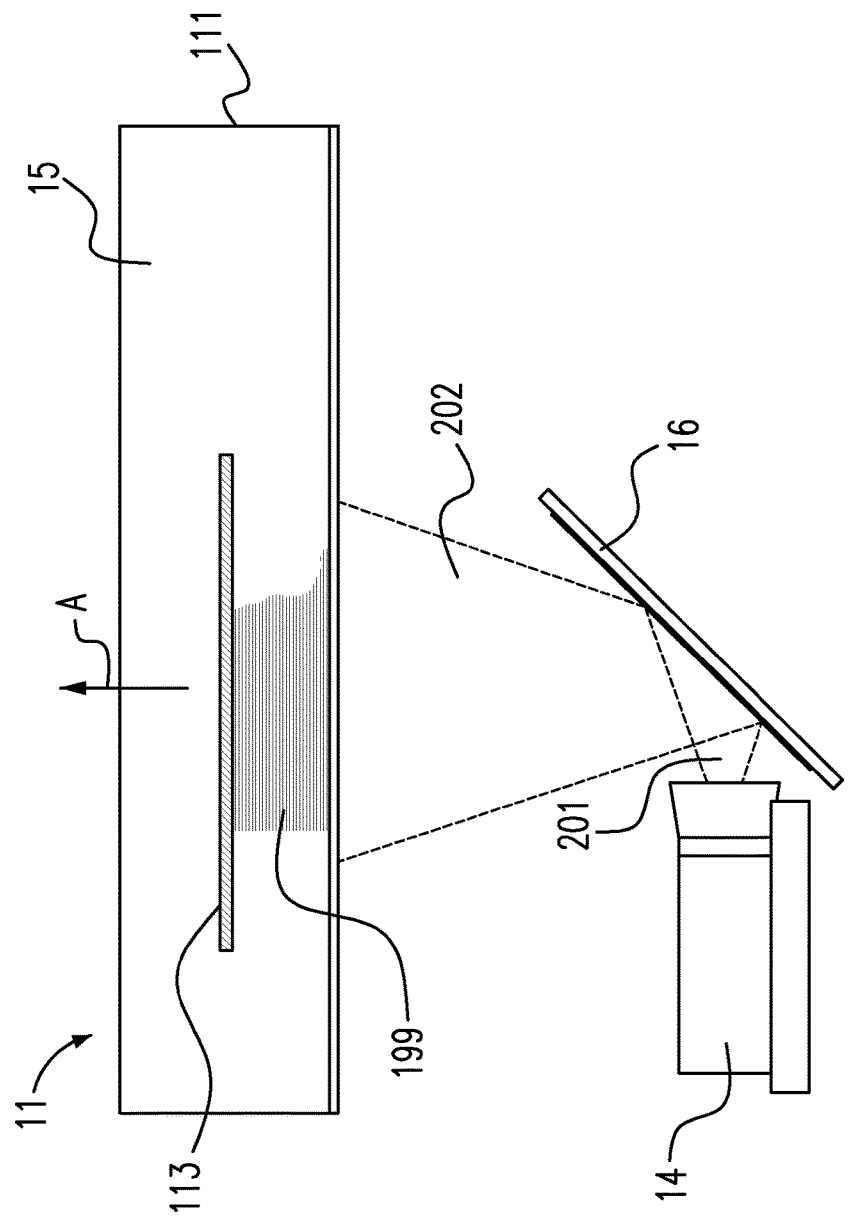
FIG. 3 is a schematic diagram showing the printing module, beam splitter and the projector in FIG. 1.

Please refer to FIG. 3, which is the schematic diagram of the printing module 11, the beam splitter 16 and the projector 14 in FIG. 1, wherein the printing module 11 further includes: a foundation 111, a frame body 112 (shown in FIG. 1), a loading apparatus 113, a movement control apparatus 114 (shown in FIG. 1) and a feeding apparatus (not shown). The foundation 111 is a frame structure which has a capacity space 15, wherein the space size can be as large as 80 mm (length)×80 mm (width)×80 mm (height). The materials output from the feeding apparatus are loaded in the capacity space 15. The frame body 112 is connected to the foundation 111 perpendicularly to carry the weight thereof and at a distance such that a space exists between the foundation 111 and the projector 14. The loading apparatus 113 is situated in the capacity space 15 and connected to the movement control apparatus 114, wherein the movement control apparatus 114 causes the loading apparatus 113 to perform a linear displacement motion in a first direction A or a second direction B in the capacity space 15, and there is an angular difference of 180 degrees between the first direction A and the second direction B. In the present embodiment, the first direction A is the upward direction which is perpendicular to the ground, and the second direction B is the downward direction which is perpendicular to the ground. In the first embodiment of the present invention, the movement control apparatus 114 further includes at least one first guide bar and at least one first driving unit. Preferably, there are two first guide bars, and they are mutually parallel and situated at both sides of the capacity space 15. The first driving unit is a motor, which is connected to the first guide bar(s) and is used to control the speed and position of the loading apparatus 113 performing the linear displacement motion along the first direction A or the second direction B.

The feeding apparatus is connected to the computer apparatus 13, wherein the feeding apparatus provides material to the foundation 111. In the first embodiment of the present invention, the material is preferable (but not restricted to) photosensitive resin 199, or any other material which is curable by light irradiation. The bottom of the foundation 111 is a transparent material or other material which is pervious to light, and the light cures the photosensitive resin 199. After the material is cured by light irradiation from the projector 14 and attached to the loading apparatus 113, the loading apparatus 113 rises up, and at this time, the feeding apparatus inputs a certain amount of material into the capacity space 15 again. Then, the material cures by light irradiation from the projector 14 and attaches to the loading apparatus 113 again, and the loading apparatus 113 rises up again. The above process is repeated to accomplish a printed 3D piece corresponding to the object 200.

In the present embodiment, the projector 14 in the printing module 11 is preferably (but not restricted to) a high resolution DLP projector, which is a 3D light-cured molding method and has a difference compared to a Stereo Lithography Appearance (SLA) in that: the SLA uses laser light to cause the resin to cure for molding. Because laser light is a thin and long straight line, the manufacturing process will be extended, and the cost is higher to use laser light as an excitation source. However, a DLP projector uses the projected light 201 from metal halide compounds (where the projected light 201 partially overlaps the reflected light 202 in FIG. 3), and then controls whether the light irradiates the photopolymer via a Digital Micromirror Device (DMD) or not Because the light used in a DLP projector manufacturing process can irradiate an area rather than a thin point at one time, the processing time can be reduced, and the DLP projector manufacturing process can control the accuracy via the DMD.

Figure 4A:
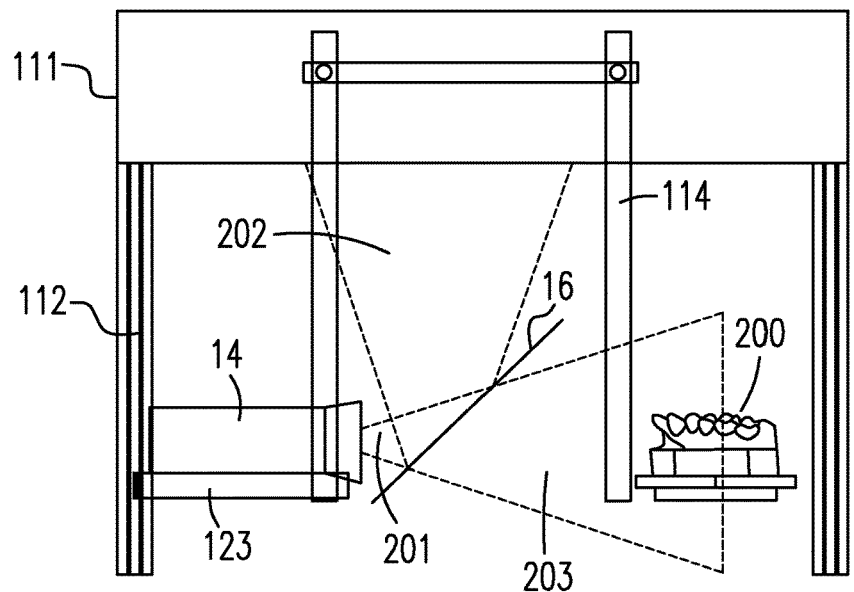
FIG. 4A is a schematic diagram showing the projected light reflecting and penetrating from the beam splitter in FIG. 1.
Figure 4B:
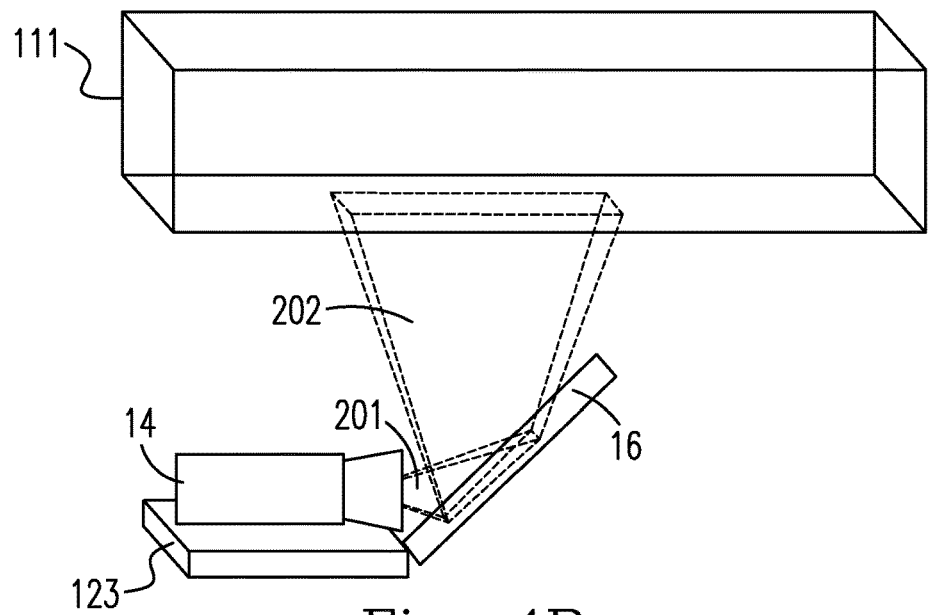
FIG. 4B is a schematic diagram showing the projected light reflecting from the beam splitter in FIG. 1.

Please refer to FIGS. 4A and 4B, which are respectively the schematic diagrams of the projected light 201 (the projected light 201 overlaps the reflected light 202 partially in FIG. 4A) reflecting and penetrating from the beam splitter 16 in FIG. 1, and the schematic diagram of the projected light 201 (the projected light 201 overlaps the reflected light 202 partially in FIG. 4B) reflecting from the beam splitter in FIG. 1. As mentioned above in the present embodiment, the scanning module 12 is placed under the printing module 11. The two scanning modules share a projector 14, in order to cause the projected light 201 from the projector 14 to be projected onto the object 200 (in the capturing region) and the foundation 111 of the printing module 11. The multifunctional 3D scanning/printing apparatus 10 in the present invention includes a beam splitter 16, which is preferably (but not restricted to) a transflective mirror or a flipping mirror.

For example, in the first embodiment of the present invention, when using the scanning function, the projected light 201 from the projector 14 can penetrate the transflective mirror and become the penetrating light 203 projected onto the object 200 (in the capturing region), or the reflective mirror can be flipped to make it parallel with the ground such that the projected light 201 from the projector 14 is directly projected onto the object 200 (in the capturing region), where the 3D data can be captured by the image sensor 121, then a 3D model for the surface in one direction can be calculated by computer apparatus 13 or an other calculating unit. Furthermore, the object 200 to be scanned can be rotated by the tiltable and horizontally rotatable mechanism 115 to acquire the entire 3D model data for the object 200 using coded images. When using the printing module 11, the projected light 201 from the projector 14 is reflected by a transflective mirror or a flipping mirror to become the reflected light 202 onto the foundation 111 of the printing module 11, and then each coded image can be projected thereby through control by the computer apparatus 13. The loading apparatus 113 is gradually driven to perform a linear displacement motion in a first direction A or a second direction B in the capacity space 15. Finally, a 3D model corresponding to the object 200 is stacked layer by layer according to each coded image.

In the first embodiment of the present invention, the computer apparatus 13 is electrically connected to the image sensor 121, the projector 14, the movement control apparatus 114, the tiltable and horizontally rotatable mechanism 115 and the feeding apparatus, which is the operating core for the multifunctional 3D scanning/printing apparatus 10. Specifically, the computer apparatus 13 saves and integrates the 3D image data which is captured by the scanning module 12, and transforms the data into a 3D movement control signal for output after processing the data, wherein the computer apparatus 13 electrically connected to the image sensor 121 receives, saves and integrates the 3D image data from the scanned object 200. The computer apparatus 13 electrically connected to the projector 14 controls the time period during which the projector 14 projects a light onto the object 200 and serves as a heat source. The computer apparatus 13 electrically connected to the movement control apparatus 114 controls the linear displacement motion carried out by the loading apparatus 113 in the capacity space 15. The computer apparatus 13 electrically connected to the tiltable and horizontally rotatable mechanism 115 rotates and adjusts the position of the object 200 to be scanned, and the computer apparatus 13 electrically connected to the feeding apparatus controls the amount of material with which the feeding apparatus provides the foundation 111.

Figure 5:
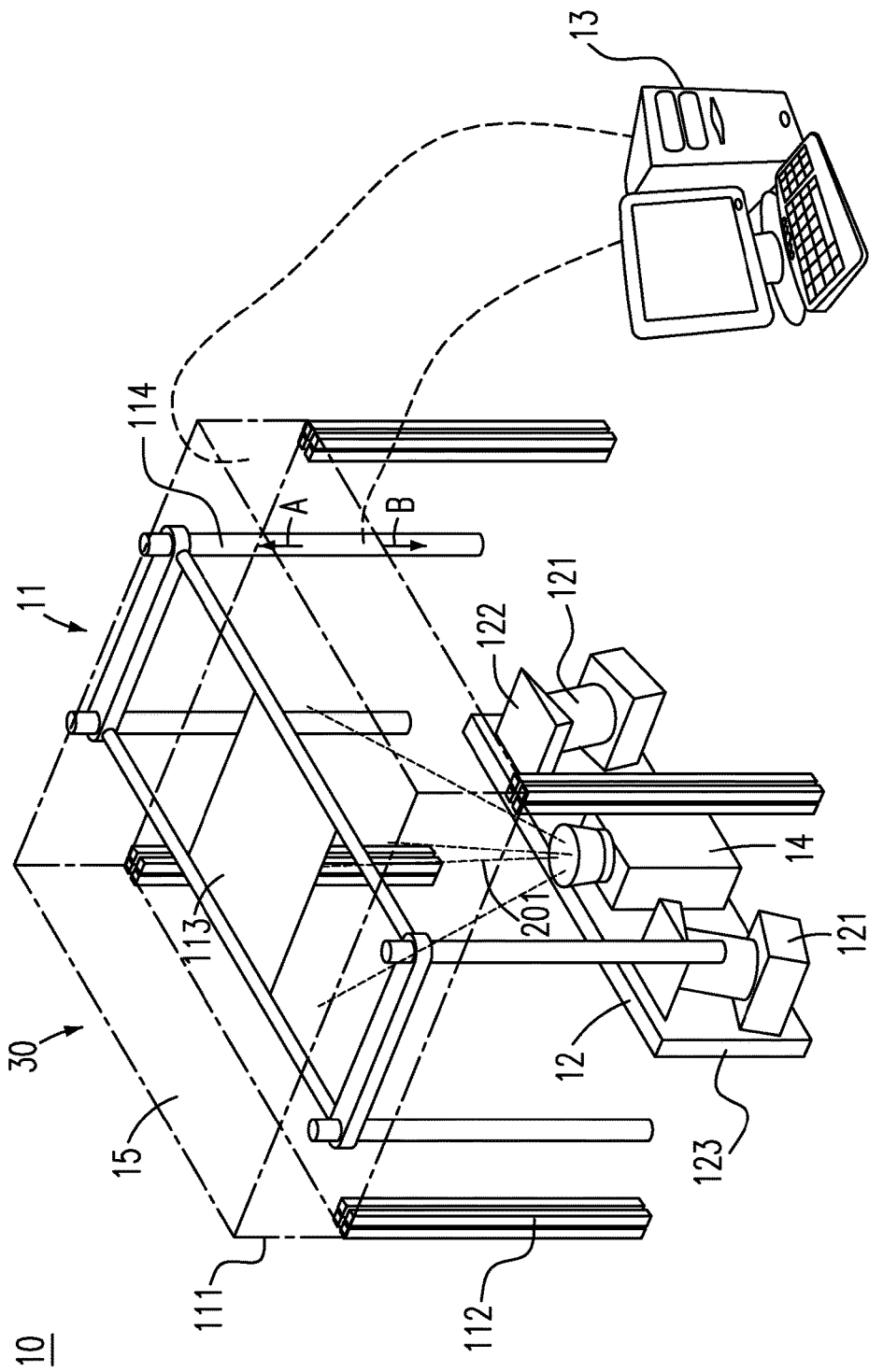
FIG. 5 is a schematic diagram of another embodiment of the multifunctional 3D scanning/printing apparatus in the present invention.
Figure 6:
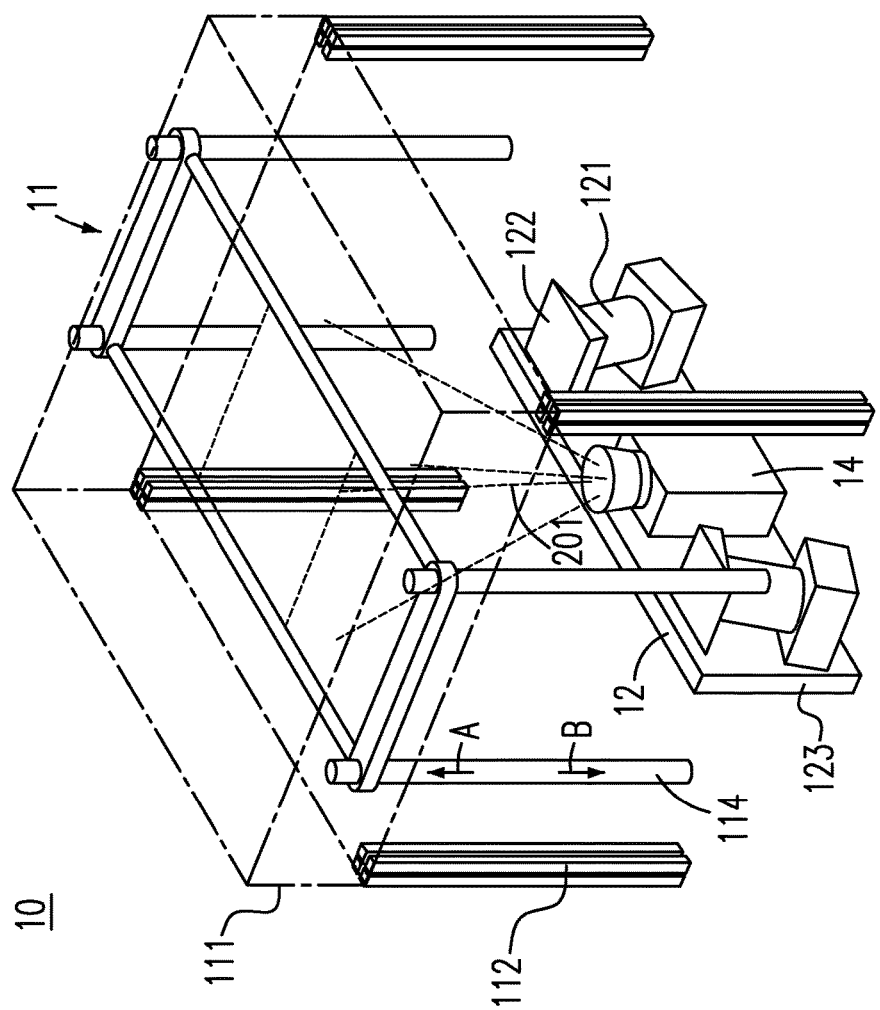
FIG. 6 is a schematic diagram showing the projected light serving as a heat source to irradiate the foundation in FIG. 5.

In addition, please refer to FIGS. 5 and 6, which are respectively the schematic diagram of the multifunctional 3D scanning/printing apparatus 10 according to the second embodiment of the present invention and the schematic diagram of the projected light 201 thereof serving as a heat source for the foundation 111. The structures of the multifunctional 3D scanning/printing apparatus 10 in the present embodiment are similar to those mentioned in the first embodiment, wherein the difference is that an "overlapping mode" for the capturing region and the printing region is hereby used. Thus, assistance from the beam splitter 16 is not necessary. The 3D scanning module 12 is configured under the printing module 11, wherein the bottom of the foundation 111 is a transparent material, which allows the projected light 201 projected by the DLP projector to penetrate through and the projected image can be captured by the two image sensors 121. When using the scanning function, the object 200 must be placed on the bottom of the foundation 111. The tiltable and horizontally rotatable mechanism 115 is supported by an optional cantilever. We then analyze the image produced by projecting the structured light to acquire the 3D data from the surfaces of the object 200 in one direction, and finally acquire the complete 3D model after scanning the object 200 an adequate number of times.

The multifunctional 3D scanning/printing apparatus 10 in the present invention configures the required elements for 3D scanning and printing in a limited space (within the same apparatus), and successfully prevent the measurement accuracy of the two image sensors 121, with assistance from the accuracy-increasing apparatus 122, from being restricted by the relatively smaller angle between the two image sensors 121. Therefore, the required space is reduced and the working efficiency is enhanced in the present invention.

While the invention has been described in terms of what are presently considered to be the most practical and preferred embodiments, it is to be understood that the invention need not be limited to the disclosed embodiments. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A multifunctional 3D scanning and printing apparatus for scanning an object and printing a 3D structure, comprising:
   an apparatus body kept at a specific position relative to the object and the 3D structure;
   a light projection apparatus configured on the apparatus body to project a first light on the object and a second light on the 3D structure;
   a scanning module configured on the apparatus body to capture 3D image data based on the reflected first light corresponding to the object;
   an accuracy-increasing apparatus configured between the scanning module and the object to increase the accuracy of the 3D image data;
   a computer apparatus coupled to the scanning module, and transforming the 3D image data into a 3D movement control output signal;
   a printing module coupled to the computer apparatus and outputting the 3D structure based on the 3D movement control output signal, wherein the 3D structure is formed by using the second light; and
   a light guide apparatus configured and fixed in a position among the light projection apparatus, the object and the printing module, wherein the first light passes through or passes by the light guide apparatus and is distributed onto the object, and the second light representing a sequential 2D image of the object is reflected by the light guide apparatus and distributed onto the printing module.

2. The multifunctional 3D scanning and printing apparatus as claimed in claim 1, wherein the scanning module comprises at least one image sensor being one of a Charge-Coupled Device (CCD) or a Complementary Metal-Oxide Semiconductor (CMOS) image sensor which is mounted on the accuracy-increasing apparatus.

3. The multifunctional 3D scanning and printing apparatus as claimed in claim 2, wherein the scanning module comprises a rotatable mechanism rotating the object horizontally or vertically for the at least one image sensor to capture a portion of the 3D image data corresponding to the surface of the object in at least one direction.

4. The multifunctional 3D scanning and printing apparatus as claimed in claim 3, wherein the computer apparatus saves and integrates the portion of the 3D image data to get the 3D image data corresponding to the object.

5. The multifunctional 3D scanning and printing apparatus as claimed in claim 1, wherein the printing module comprises:
   a foundation being a frame structure, and having a capacity space;
   a frame body perpendicularly connected to the foundation;
   a loading apparatus situated in the capacity space; and
   a movement control apparatus connected to the loading apparatus, wherein the movement control apparatus causes the loading apparatus to carry out a linear displacement motion in one of a first direction and a second direction within the capacity space.

6. The multifunctional 3D scanning and printing apparatus as claimed in claim 1, wherein the light projection apparatus is maintained at a specific position relative to the scanning module, the printing module and the object to project the second light onto the 3D structure and serve as a heat source.

7. The multifunctional 3D scanning and printing apparatus as claimed in claim 6, wherein the light projection apparatus is a Digital Light Processing (DLP) projector.

8. The multifunctional 3D scanning and printing apparatus as claimed in claim 1, wherein the accuracy-increasing apparatus is an asymmetric lens.

9. The multifunctional 3D scanning and printing apparatus as claimed in claim 1, wherein the light guide apparatus is one of a transflective mirror or a flipping mirror.

10. A multifunctional 3D scanning and printing apparatus for scanning an object and printing a 3D structure object, comprising:
    an apparatus body maintained at a specific position relative to the object and the 3D structure;
    a scanning module configured on the apparatus body to capture 3D image data corresponding to the object;
    a printing module configured on the apparatus body to output a 3D structure corresponding to the object according to the 3D image data;
    a projector maintained at a specific position relative to the scanning module, the printing module, the object and the 3D structure, wherein the projector projects a first light on the object for the scanning module and a second light onto the 3D structure serving as a heat source for the printing module; and
    a light guide apparatus configured and fixed in a position among the projector, the object and the printing module to pass therethrough or thereby the first light onto the object, and reflect the second light representing a sequential 2D image of the object onto the printing module.

11. The multifunctional 3D scanning and printing apparatus as claimed in claim 10, wherein the light guide apparatus is one of a transflective mirror or a flipping mirror.

12. The multifunctional 3D scanning and printing apparatus as claimed in claim 10, further comprising an accuracy-increasing apparatus configured between the scanning module and the object to increase the accuracy of the 3D image data.

13. The multifunctional 3D scanning and printing apparatus as claimed in claim 12, wherein the accuracy-increasing apparatus is an asymmetric lens.

14. A multifunctional 3D scanning and printing apparatus for scanning an object and printing a 3D structure, comprising:
- an apparatus body maintained to be at a specific position relative to the object and the 3D structure;
- a light projection apparatus configured on the apparatus body to project a first light on the object and a second light on the 3D structure;
- an input unit configured on the apparatus body to capture 3D image data based on the reflected first light corresponding to the object;
- an output unit configured on the apparatus body to output a 3D structure corresponding to the object according to the 3D image data wherein the 3D structure is formed by using the second light; and
- a light guide apparatus configured and fixed in a position among the light projection apparatus, the object and the output unit to pass therethrough or thereby the first light onto the object, and reflect the second light representing a sequential 2D image of the object onto the output unit.

15. The multifunctional 3D scanning and printing apparatus as claimed in claim 14, wherein the light guide apparatus is one of a transflective mirror or a flipping mirror.

16. The multifunctional 3D scanning and printing apparatus as claimed in claim 14, further comprising an accuracy-increasing apparatus, configured between the input unit and the object to increase the accuracy of the 3D image data.

17. The multifunctional 3D scanning and printing apparatus as claimed in claim 16, wherein the accuracy-increasing apparatus is an asymmetric lens.

18. The multifunctional 3D scanning and printing apparatus as claimed in claim 14, further comprising a light projection apparatus which is maintained at a specific position relative to the input unit, the output unit and the object to project the second light onto the 3D structure and serve as a heat source.

19. The multifunctional 3D scanning and printing apparatus as claimed in claim 18, wherein the light projection apparatus is a Digital Light Processing (DLP) projector.

* * * * *